TURRET WINDER FOR TAPE
Filed Nov. 2, 1967 11 Sheets-Sheet 1
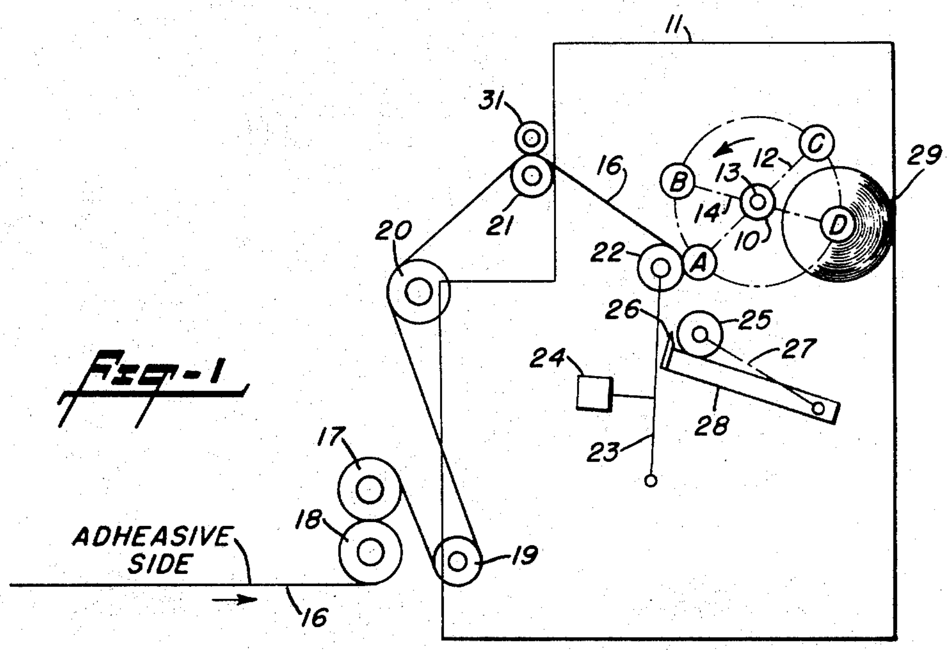
FIG. 1
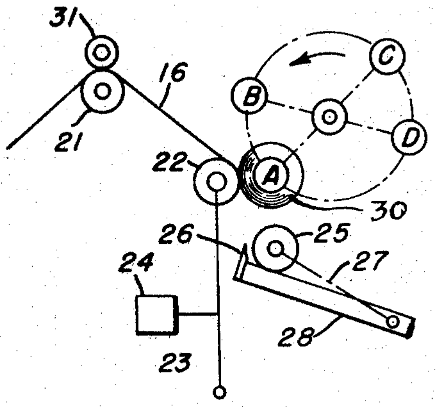
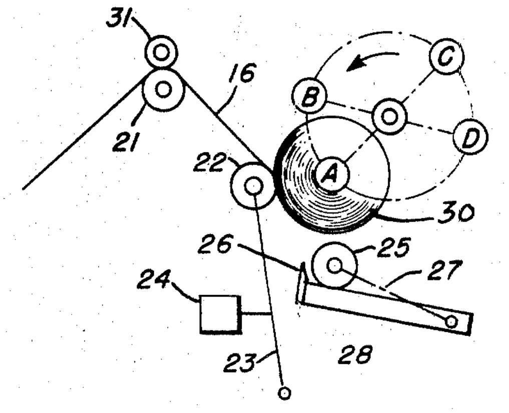
FIG. 2 FIG. 3
ROGER W. YOUNG
INVENTOR.
BY Rudolph J. Juick
ATTORNEY

ROGER W. YOUNG
INVENTOR.

BY

ATTORNEY

TURRET WINDER FOR TAPE

Filed Nov. 2, 1967 11 Sheets-Sheet 3

ROGER W. YOUNG
INVENTOR.

BY Rudolph J. Jurick
ATTORNEY

Oct. 14, 1969 R. W. YOUNG 3,472,462

TURRET WINDER FOR TAPE

Filed Nov. 2, 1967 11 Sheets-Sheet 4

ROGER W. YOUNG
INVENTOR.

BY Rudolph J. Juick
ATTORNEY

ROGER W. YOUNG
INVENTOR.

BY Rudolph J. Juick
ATTORNEY

ROGER W. YOUNG
INVENTOR.
BY Rudolph J. Anick
ATTORNEY

TURRET WINDER FOR TAPE

Filed Nov. 2, 1967 11 Sheets-Sheet 7

ROGER W. YOUNG
INVENTOR.

BY Rudolph J. Juick
ATTORNEY

TURRET WINDER FOR TAPE

ROGER W. YOUNG
INVENTOR.

BY Rudolph J. Juick
ATTORNEY

Oct. 14, 1969 R. W. YOUNG 3,472,462

TURRET WINDER FOR TAPE

Filed Nov. 2, 1967 11 Sheets-Sheet 9

ROGER W. YOUNG
INVENTOR.

BY Rudolph J. Juick
ATTORNEY

ROGER W. YOUNG
INVENTOR.

BY Rudolph J. Frick
ATTORNEY

ROGER W. YOUNG
INVENTOR
BY Rudolph J. Juick
ATTORNEY

3,472,462
TURRET WINDER FOR TAPE

Roger W. Young, Upper Montclair, N.J., assignor to John Dusenbery Company, Inc., Clifton, N.J., a corporation of New Jersey Filed Nov. 2, 1967, Ser. No. 680,232
Int. Cl. B65h *19/20, 75/34*
U.S. Cl. 242—56 13 Claims

ABSTRACT OF THE DISCLOSURE

Apparatus for continuously winding pressure-sensitive tape into rolls on cores. Cores are carried by a pair of turrets which are indexed to move successive cores into and out of a winding station and a fly knife cuts the tape after a new core is positioned in the winding station and as the wound core is moved away from the winding station.

Background of the invention

The invention relates to a turret winder for continuously winding what is commonly referred to as "log rolls" of pressure-sensitive vinyl electrical tape at the discharge end of a tape coating machine.

In continuous turret winders heretofore available, the mandrels, which carry the cores on which the tape is to be wound, are widely separated at fixed distances. In order to obtain a smooth, unfolded wrap on the core at the start of the winding operation, it is essential that the fly knife cut the web of tape as close as possible to the new core, otherwise the tape will not be wound into a smooth, uniform roll of constant diameter. However, this leaves a relatively long tail of unwrapped material on the completed roll which cannot be wrapped smoothly around the finished roll by hand because of the sticky and stretchy character of the tape. Consequently, about six inches of the tape must be cut off, by hand, from each finished roll.

A turret winder made in accordance with this invention overcomes the shortcomings of existing winders. The web of tape is cut at a time when the wound roll and a new core are separated by a minimum distance so that even though the tape is cut very close to the new core the tail of the unwrapped tape also is very short and, therefore, readily wrapped onto the wound roll automatically. The winding operation is carried on continuously without slowing down or stopping movement of the tape.

Summary of the invention

Two pairs of cores, rotatable by individual motors, are carried by two turrets which are independently rotatable about a common axis. Adjacently-disposed cores are carried by different turrets. During one portion of the machine operating cycle, the turrets are indexed simultaneously, thereby to position a new core in the winding station and to remove a completed roll of the tape from such station and into engagement with a first contact roll carried by a pivot arm. As the new core is moved into the winding station it is not rotating, and when the new core is positioned in the winding station, a fly knife is triggered to cut the web of tape at a point very close to the new core. The completed roll continues rotating during and after the tape-cutting operation, whereby the first contact roll causes the tail end of the tape to be wrapped smoothly onto the completed roll. Immediately upon the cutting of the web of tape, the new core starts rotating and a second contact roll presses the adhesive side of the tape against the new core, whereby the tape is wound into a roll about such core. While this winding operation is progressing, the previously-complete roll stops rotating but the supporting turret continues indexing to a final position, thereby to locate such completed wound roll in the unloading station. Each pair of the cores is located on a diameter of the respective turret so that when the stated previously-completed roll is in the unloading station, the corresponding core of this set is in the ready position, that is, spaced a predetermined distance from the winding station. The two turrets operate somewhat like a pair of scissors to bring adjacently-disposed cores into relatively close proximity at the winding station for the cutting of the web of tape and thereafter to remove the finished roll to the unloading station while, at the same time, positioning another new core for subsequent movement into the winding station.

An object of this invention is the provision of an improved turret winder for continuously winding tape into rolls.

An object of this invention is the provision of apparatus for winding a web of tape onto cores moved sequentially to a winding station, which apparatus automatically cuts the web of tape, fastens the leading edge of the cut tape to a new core and wraps the trailing edge of the cut tape smoothly about the wound core.

An object of this invention is the provision of tape winding apparatus comprising a pair of turrets rotatable about a common axis; mandrels removably secured to each of the turrets; turret-indexing means operable to position one mandrel in a winding station, replacing said one mandrel after a predetermined time period with an adjacently-disposed mandrel, and retaining the said adjacently-disposed mandrel in the winding station while moving the said one mandrel to an unloading station; and means for rotating the mandrels when positioned in the winding station.

An object of this invention is the provision of a continuous turret winder for winding a web of tape into rolls on individual cores carried by mandrels, said apparatus comprising sets of individually rotatable mandrel-supporting members carried by a pair of turrets, means for simultaneously indexing both turrets to position one core in a winding station and to remove an adjacently-disposed wound core from such station, means for cutting the web of tape when the said one core is positioned in the winding station, means rotating the core when in the winding station, means for automatically attaching an end of the cut tape to the said one core when rotating, means to wrap an end of the cut tape about the wound core, and means for continuing the indexing of one turret thereby to position the wound core in an unloading station.

The above-stated and other objects and advantages of the invention will become apparent from the following description when taken with the accompanying drawings. It will be understood, however, that the drawings are for purposes of illustration.

Brief description of the drawings

In the drawings wherein like reference characters denote like parts in the several views;

FIGURE 1 is a diagrammatic representation, in elevation, showing the operative relation of various components of a winding machine made in accordance with this invention;

FIGURES 2–8 are fragmentary diagrammatic representations to show one operating cycle of the turrets;

Figure 4:
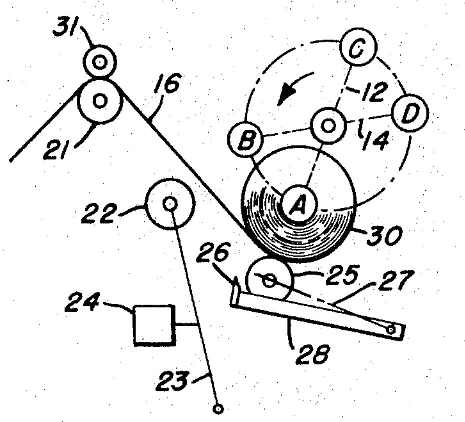

Reference now is made to FIGURE 1 showing an outer shaft 10 rotatably supported by a vertical frame 11, said shaft having secured thereto a first turret 12 carrying a pair of diametrically-opposed mandrel-supporting members which, for present purposes will be referred to as socket members A and C. An inner shaft 13 has secured thereto a second turret 14 carrying a pair of diametrically-opposed socket members B and D. The two shafts are rotatable, independently, about a common axis, thereby to change the angular spacing between adjacently-disposed socket members at preselected points in the operating cycle of the machine. Also, the socket members preferably are coupled to hydraulic motors, whereby a particular socket member is rotatable when it is in the tape-winding station. It is here pointed out that a corresponding turret and socket member arrangement is carried by second vertical frame of the machine and that longitudinally aligned socket members carry a removable mandrel for receiving a core on which the tape is to be wound.

A web 16, of pressure-sensitive vinyl electrical tape, is drawn from the tape coating machine by the driven pull rolls 17 and 18, the roll 17 preferably being made of rubber and the roll 18 having a knurled surface. The web passes around a silicone idler roll 19, a slatted, spreader roll 20, a guide roll 21 and a contact roll 22. This contact roll is rotatably carried by a pivot arm 23 which is normally biased toward the socket A by means of a hydraulic cylinder 24. A second contact roll 25 and a fly knife 26 are carried by the respective pivot arms 27 and 28.

In FIGURE 1, the socket member A is positioned in the winding station and the contact roll 22 presses the tape against the core carried by the mandrel which is coupled to such socket member; it here being pointed out that the cores and the supporting mandrels are not shown in FIGURE 1. When positioned in the winding station, the socket member A is rotated and, since the adhesive side of the tape is in contact with the core, the tape is wound into a roll thereon. During the winding operation the two turrets are retained in fixed positions and the other three socket members are stationary. Thus, a previously-wound roll 29 positioned in the unloading station, can be removed, manually, from the machine.

Figure 5:
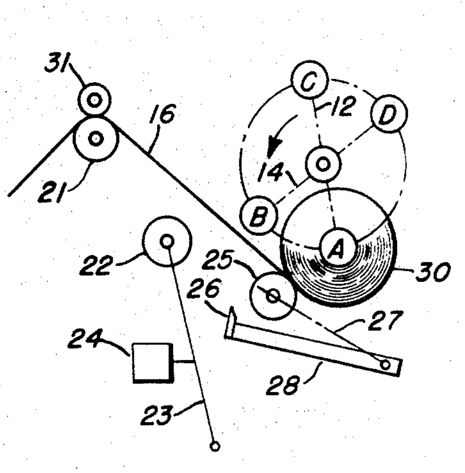

FIGURE 2 shows the previously wound roll removed from the socket member D and the increased diameter of the roll 30 in the winding station. The winding operation continues during the removal of the previously wound roll and the placement of a new mandrel and core into the socket member D. Eventually, the roll 30 reaches a predetermined diameter as shown in FIGURE 3, such diameter being determined by an electrical contactor responsive to roll footage and coupled to the roll 31 associated with the guide roll 21. Such contactor provides an electrical signal to a control system which results in the actuation of suitable mechanisms for the indexing of the turrets and the pivotal displacement of the contact roll 22. Specifically, and as shown in FIGURE 4, the contact roll 22 is retracted out of contact with the roll 30 and the tape 16, and the two turrets now are rotated, simultaneously, in a counter-clockwise direction. During such indexing of the two turrets, the winding operation continues. The angular disposition of the pivot arm 27, carrying the contact roll 25, also preferably is controlled by means of a hydraulic piston. During the major portion of the winding operation, that is, when the contact roll 22 is pressed against the roll 30, the contact roll 25 is spaced a predetermined distance from the arcuate path of travel of the socket members as shown in FIGURES 1–3. However, as the contact roll 22 is moved out of engagement with the tape, the contact roll 25 is brought into contact with the tape roll 30 and this contact roll remains in contact with the tape roll as the latter passes to the point shown in FIGURE 5.

Figure 6:
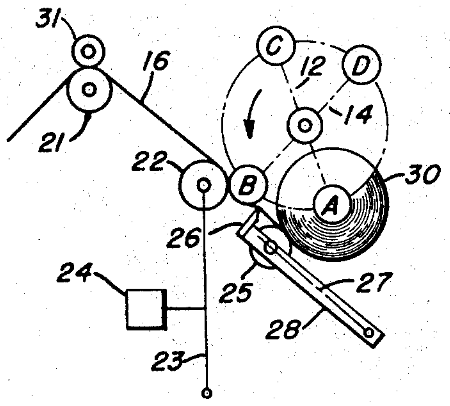

FIGURE 6 shows the positions of the socket members upon completion of the described, simultaneous indexing of the two turrets 12 and 14. The turret 14 now is retained in a fixed position and the socket member B is positioned in the winding station but it is not rotating. The indexing of the turrent 12, however, continues and the socket member A continues rotating to carry on the winding operation. After the turret 14 has been brought to the fixed position, the fly knife 26 is actuated to cut the web, the hydraulic motor coupled to socket member B rotates this socket member, and the contact roll 22 is again brought into engagement with the tape.

Figure 7:
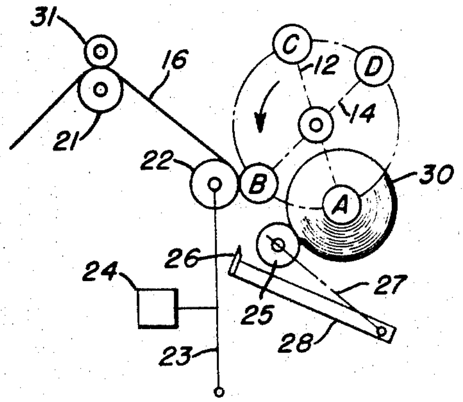

After cutting the tape, the fly knife is retracted as shown in FIGURE 7. However, the turret 12 continues indexing and the contact roll 25 remains in engagement with the still rotating tape roll 30, thereby to press the short, tail end of the tape onto the completed roll. Thereafter, the contact roll 25 is retracted to its normal position and the indexing of the turret 12 continues until such turret reaches the position shown in FIGURE 8. In this position of the turret 12, the finished tape roll is in the unloading station and the socket member C is in the "ready" position, that is, ready for movement into the winding station upon a subsequent simultaneous rotation of both turrets. At the same time, the winding of a second roll of the tape continues until such roll reaches the predetermined diameter, after which the described indexing of the turrets again takes place.

In a conventional, continuous, turret winder, the core-carrying mandrels are widely separated at fixed distances. In order to provide a smooth, unfolded wrap on the new core at the start of the winding operation, it is essential that the fly knife cut the tape close to the new core. This leaves a relatively long tail of unwrapped material on the completed roll, which tail cannot be wrapped smoothly around the roll by hand because of the stretchy and sticky nature of the tape. Consequently, it is the present practice to cut off, by hand, approximately six inches of tape from each wound roll. In a turret winder made in accordance with this invention, the spacing between adjacently-disposed cores is changed automatically at predetermined points in the machine operating cycle. The spacing between the wound roll of tape and the new core is a minimum at the moment the fly knife cuts the tape. Consequently, although the web desirably is cut very close to the new core, the tail end of the unwrapped tape on the wound roll also is very short. Such tail end is wrapped smoothly onto the completed roll by means of a contact roll as the turret is rotated to position the completed roll in the unloading station. The knife cuts the web in a direction such that the leading end of the cut web is pressed against the new core during the tape cutting action, thereby resulting in the automatic attachment of the tape to such core for the winding of a roll of the tape thereon.

Figure 9:
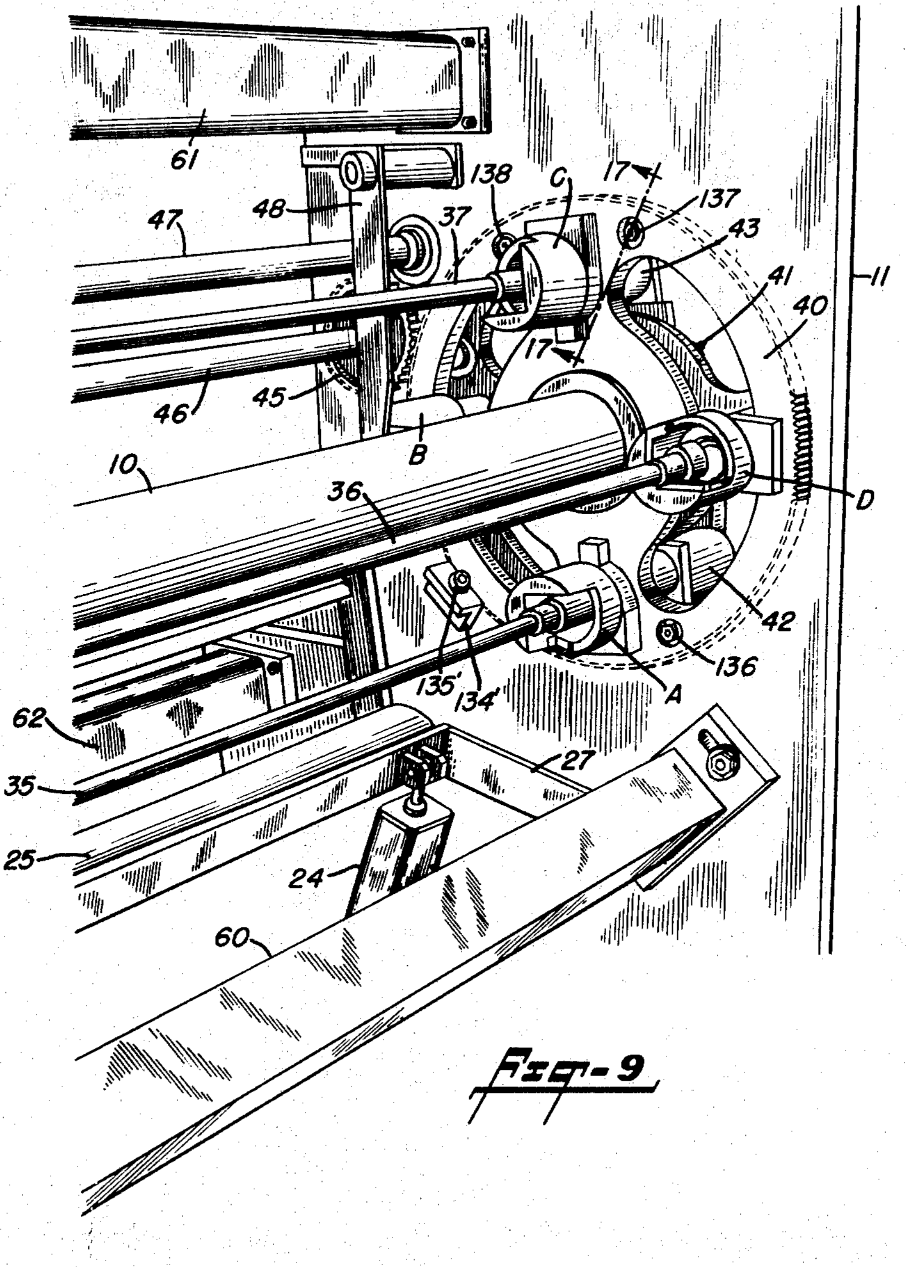
FIGURE 9 is a fragmentary isometric view taken from the back, or unloading end, of the machine and showing the right, vertical frame of the machine.

Reference now is made to FIGURE 9 which is a fragmentary, isometric view taken from the rear, or unloading end, of the machine. Here are shown the right, vertical machine frame 11, the outer tubular shaft 10, the four socket members A, B, C and D, and the contact roll 25 carried by the pivot arm 27 coupled to the hydraulic cylinder 24, all of these reference characters corresponding to those shown in FIGURE 1. The construction and arrangement of the socket members will be described hereinbelow. For the present, it is pointed out that the mandrels, carrying the cores upon which the tape is to be wound, are removably coupled to the socket members, three such mandrels 35, 36 and 37 being visible in this particular view. One turret comprises the outer shaft 10 having an end gear 40 secured thereto, said gear having a pair of arcuate openings formed therein. The other turret comprises a shaft passing through the tubular shaft 10 and having a similar end gear 41 secured to the projecting end thereof. These gears 40 and 41 are disposed on opposite sides of the frame 11. The first pair of socket members A and C are secured to one side of the gear 40 and the associated drive motors 42 and 43 are secured to the opposite side of this gear, said drive motors being visible through the aligned portions of the arcuate openings in the two gears. Each of the socket members A and C carry rotatable shafts which pass through the arcuate openings of the gear 41 and are coupled to the associated drive motor. Similarly, the second pair of socket members B and C and their associated drive motors are secured to the gear 41 with connecting shafts passing through the arcuate openings of the gear 40. A first drive gear 45, carried by a drive shaft 46, meshes with the end gear 40 and a second drive gear, carried by the drive shaft 47 meshes with the gear 41. One of the pivot arms 48, carrying the fly knife also is visible in this figure.

Figure 8:
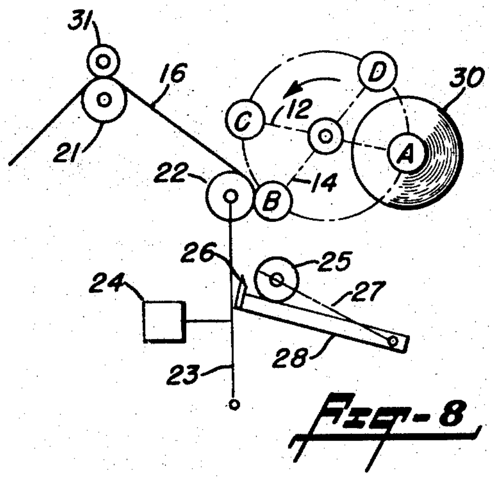
Figure 10:
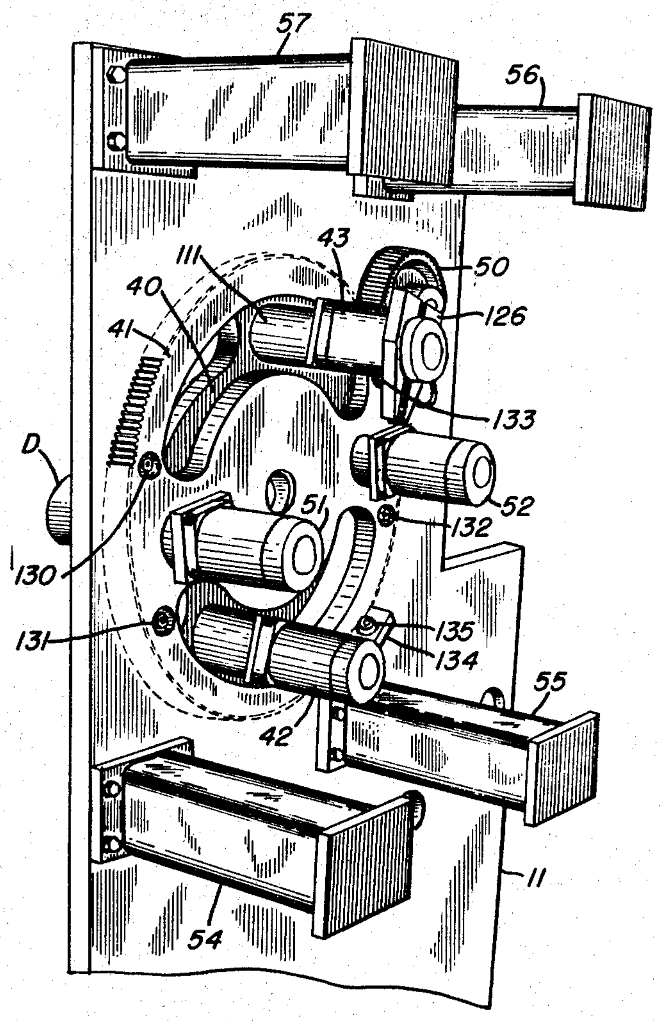
FIGURE 10 is a similar view, taken from another angle, and showing the outer surface of the right, vertical frame.

FIGURE 10 is a fragmentary, isometric view showing the outside surface of the right frame 11. Shown in this view is the second drive gear 50, which meshes with the end gear 41 of the turret, and the two drive motors 51 and 52 associated with the second pair of socket members B and D, a portion of the latter socket member being visible in this particular view. It will now be apparent that the two end gears 40 and 41 can be rotated simultaneously by means of the two drive gears or one end gear can be rotated while the other remains stationary. The simultaneous rotation of both end gears corresponds to a simultaneous rotation of the two turrets identified by the numerals 12 and 14 in FIGURES 4 and 5 (thereby to move a wound roll of tape out of the winding station while moving the adjacent trailing core into the winding station), and rotation of one end gear while the other remains stationary corresponds to the rotation of the turret 12 to move the wound roll to the unloading station as shown in FIGURE 8. Also shown in FIGURE 10 are four rigid, tubular posts 54–57 to which a heavy end plate is secured for purposes which will be described hereinbelow.

Figure 11:
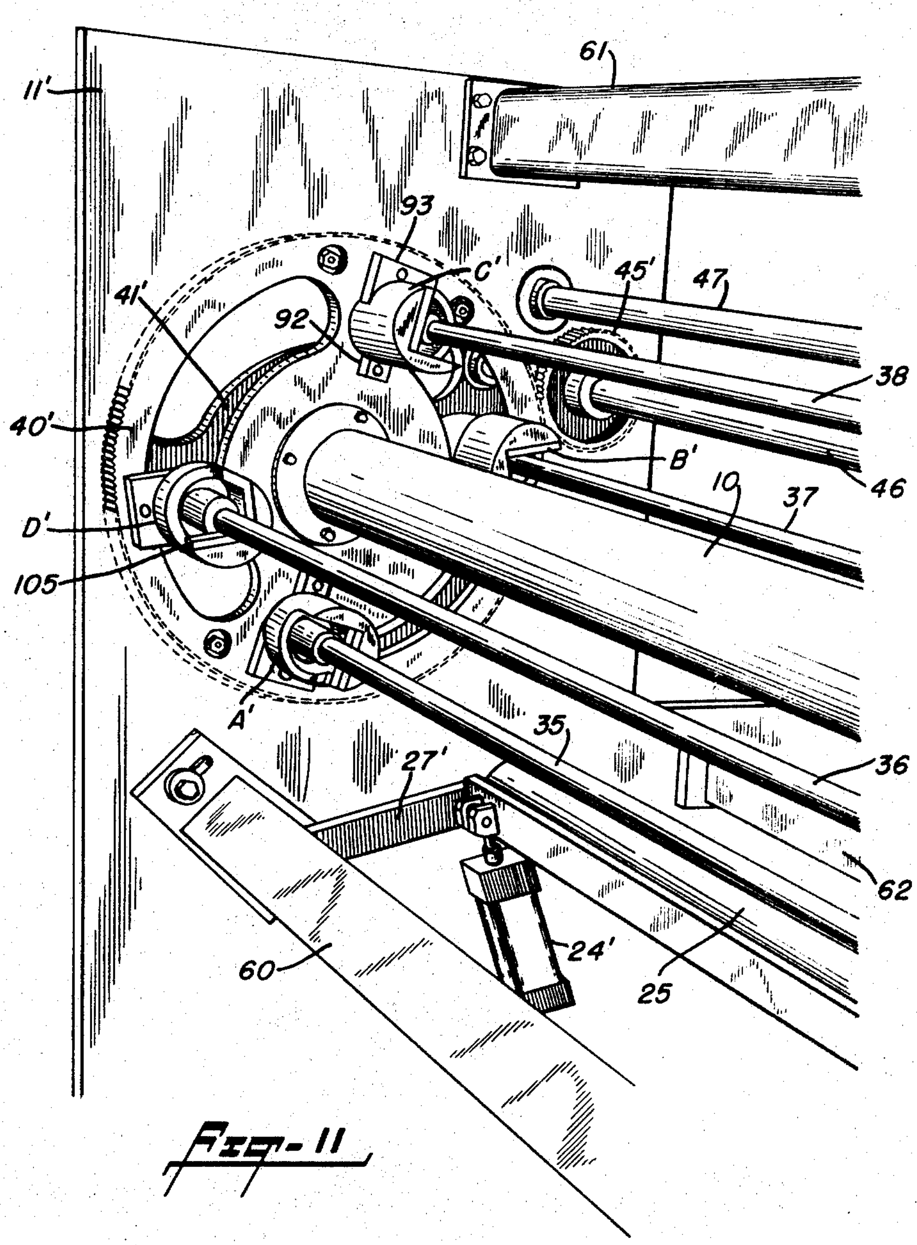
FIGURE 11 is a fragmentary, isometric view taken from the back of the machine and showing the left, vertical machine frame.

FIGURE 11 is a fragmentary, isometric view also taken from the rear, or unloading end, of the machine and showing the left, vertical frame 11′ of the machine. The two machine frames are secured together by three, tubular cross bars 60, 61 and 62, see also FIGURE 9. Positioned at this side of the machine are end gears, drive gears and socket members, which parts correspond to those shown in FIGURE 9 and are identified by primed, corresponding reference characters. The ends of each mandrel are removably secured to longitudinally-aligned socket members A, A′, B, B′, etc.

Figure 12:
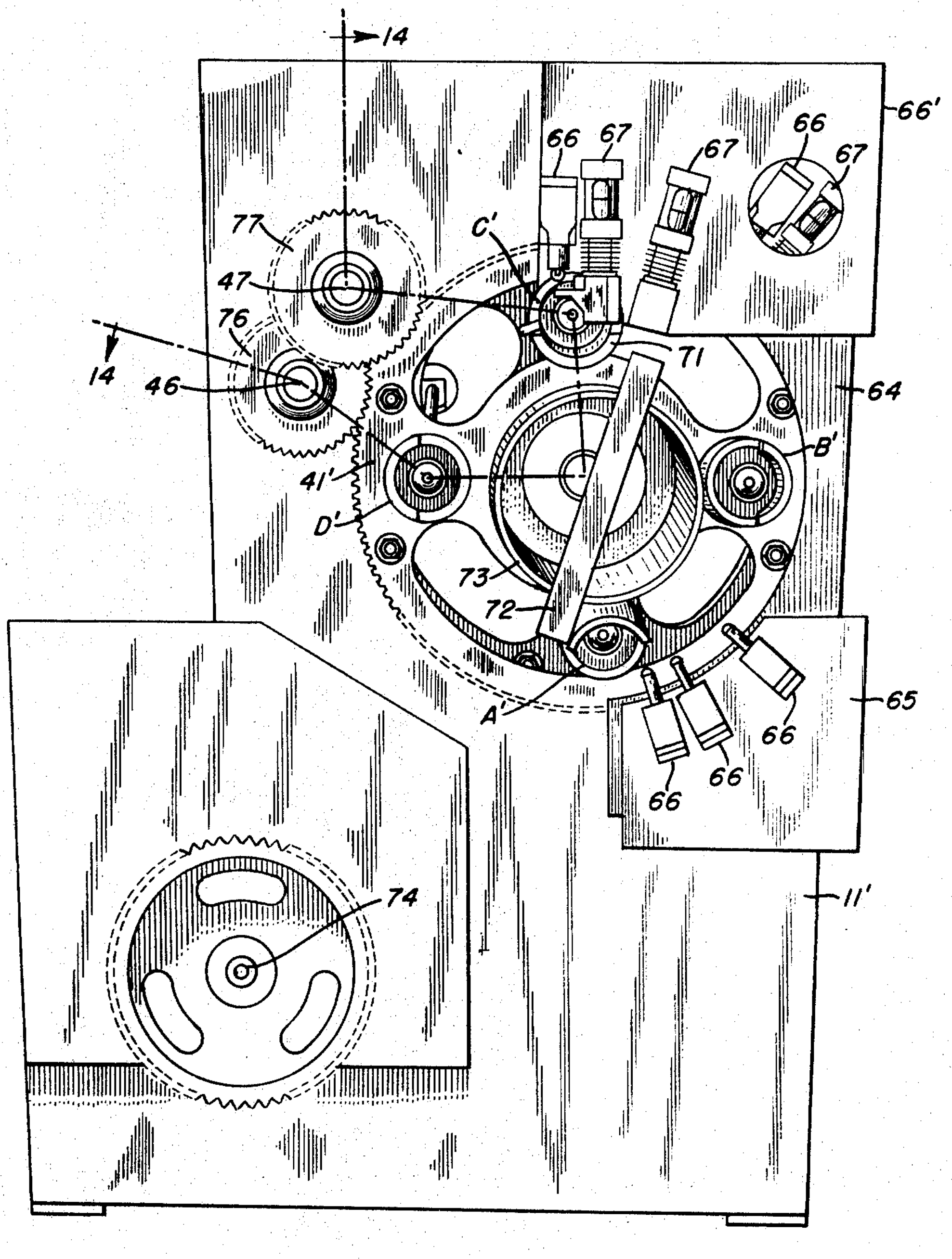
FIGURE 12 is an elevational view taken from the left side of the machine.
Figure 13:
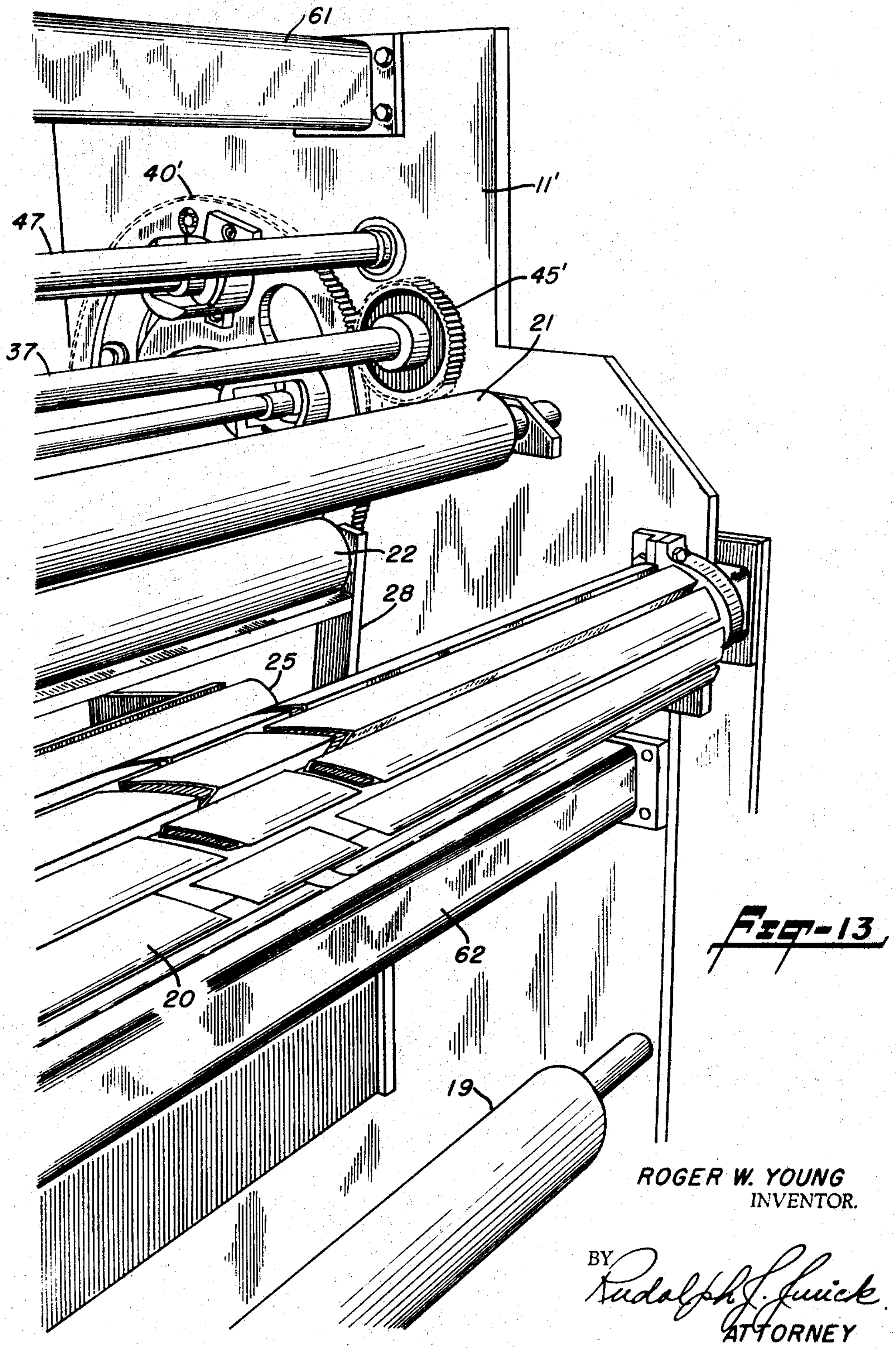
FIGURE 13 is a fragmentary, isometric view taken from the front of the machine and including the left, vertical frame.

The side elevational view of FIGURE 12 shows the outer surface of the left machine frame 11′, to which frame are secured spaced plates 64, 65 and 66′. These plates carry various spring-biased electrical switches 66 and valves 67 for controlling the machine operating cycles. The operation of such valves and switches is controlled by suitable, radially-extending dogs (which are not shown in the drawing but would be secured to the socket members A′, B′, C′ and D′) and radially-extending arms carried by a U-shaped bracket 72 which is welded to a cylinder 73, said cylinder having an integral inwardly-directed flange bolted to the end gear 41′. The switches, valves and their operating members are subject to a wide lattitude in construction and arrangement and it here need only by pointed out that they control the rotation of the turrets, the motors associated with the socket members, the operation of the fly knife and the positioning of the two contact rolls. Also visible in FIGURE 12 are two sprockets 76 and 77 secured to the respective drive shafts 46 and 47. These sprockets are individually connected, by drive chains, to corresponding sprockets carried by the main drive shaft 74 of the machine. Such drive shaft, rotated continuously by the main motor of the machine when the machine is in operation, carries two electromagnetic devices, each such device being a combination clutch and brake. Thus, energization of one or both of these devices results in the rotation of one or both of the sprockets 76 and 77. Rotation of the sprocket 76 results in the rotation of what will now be referred to as the inner turret comprising the outer tubular shaft carrying the two end gears disposed along the inner surfaces of the two machine frames. More specifically, rotation of the sprocket 76, FIGURE 12, results in a corresponding rotation of the drive gear 45 coupled to the end gear 40, as seen in FIGURE 9, and rotation of the corresponding drive gear 45′ coupled to the end gear 40′ as seen in FIGURE 13. Similarly, rotation of the sprocket 77, FIGURE 12, results in the rotation of the other, or outer turret, comprising the inner shaft carrying the end gears disposed along the outside surfaces of the two machine frames. More specifically, rotation of the sprocket 77 results in a corresponding rotation of the drive gear 50 coupled to the end gear 41, as seen in FIGURE 10, and the corresponding drive gear coupled to the end gear 41′, see FIGURE 12, said corresponding end gear, secured to the drive shaft 47, being disposed behind the sprocket 47 and, therefore, not visible in this particular view.

The fragmentary, isometric view of FIGURE 13 is taken from the front of the machine and shows the silicone idler roll 19, the slatted spreader roll 20 and the guide roll 21. Also visible in this view is the contact roll 22 carried by the pivot arm 28 and the contact roll 25, see also FIGURE 1.

Figure 14:
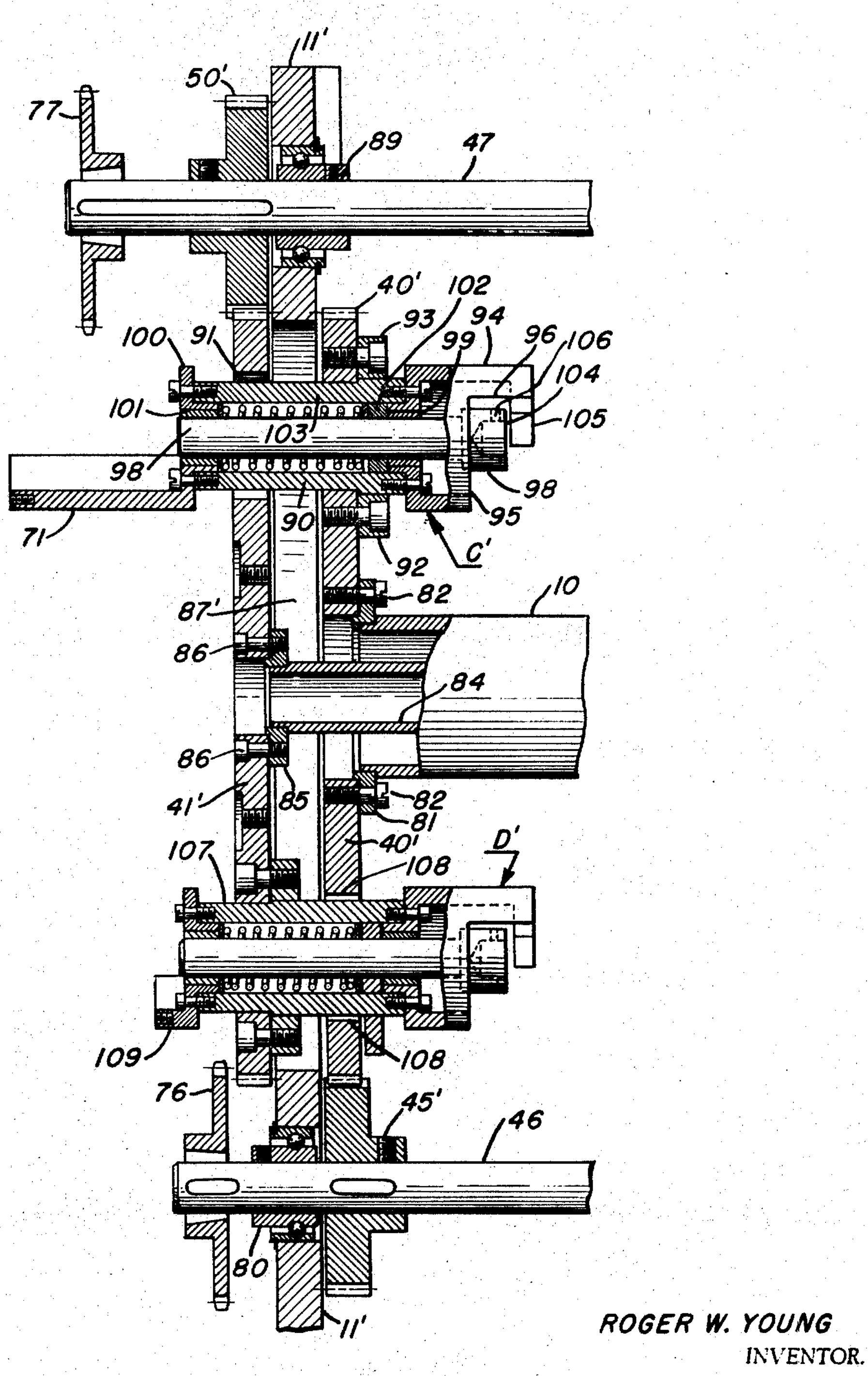
FIGURE 14 is a cross-sectional view taken along the line 14—14 of FIGURE 12 and shows the construction and arrangement of mandrel-supporting members and the parts of the two turrets disposed at the left end of the machine.

Reference now is made to FIGURE 14 which is a cross-sectional view taken along the line 14—14 of FIGURE 12 but with the U-shaped bracket 72 and the cylinder 73 omitted. The lower drive shaft 46 is supported by a bearing 80 carried by the left machine frame 11′, said shaft having secured thereto the sprocket 76 and the drive gear 45′ which is in mesh with the end gear 40′. This end gear is secured to the tubular shaft 10 by means of a flange plate 81 and the bolts 82, said flange plate being welded to the tubular shaft. For purposes of references, the end gear 40′ and the shaft 10 comprises the left end of the inner turret, said end gear carrying the diametrically-opposed socket members A′ and C′ as shown in FIGURE 11. The left end of the outer turret comprises the end gear 41′ secured to an inner, tubular shaft 84 by means of the flange plate 85 and the bolts 86, said shaft 84 extending through a large circular hole 87′ formed in the machine frame 11′. The end gear 41′ carries the diametrically-opposed socket members B′ and D′, see FIGURE 11. Whereas the socket members B′ and D′ extend through the arcuate openings formed in the end gear 40′, the socket members A′ and C′ extend through the corresponding, arcuate openings formed in the end gear 41′. The upper drive shaft 47 is supported by a bearing 89 carried by the machine frame, said shaft having secured thereto the sprocket 77 and the drive gear 50′ which is in mesh with the end gear 41′.

Figure 15:
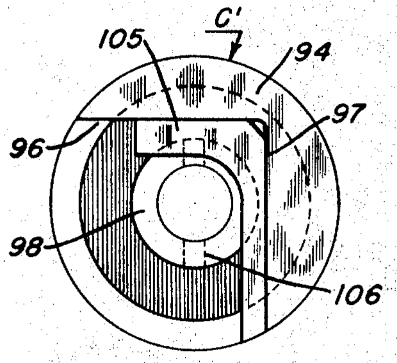
FIGURE 15 is a front elevational view of one of the mandrel-supporting members.

With continued reference to FIGURE 14, the socket member C′ comprises a body 90 passing through the circular opening 87′, of the frame, and an arcuate opening 91 of the end gear 41′, said body having a pair of lugs 92 and 93 welded thereto and each lug being fastened to the end gear 40′ by a bolt. A generally cylindrical cap 94, bolted to the end of the body 90, has a forward end which is partially cut away along a plane 95, normal to its axis, and two intersecting longitudinal planes 96 and 97, see also FIGURE 15, thereby to provide access to the enlarged end of a solid rod 98. A sleeve bearing 99 is force-fitted into the reduced-diameter end of the cap 94. A flange 100 is bolted to the other end of the body 90 and carries a sleeve bearing 101, said flange having an integral, arcuate arm 71 extending therefrom, see also FIGURE 12. This arm 71 is provided with tapped holes for receiving the bolts by means of which a radially-extending dog can be secured thereto, for the purpose of operating appropriate control switches. The rod 98 has a bushing 102 secured thereto by a pin and a compressed spring 103 normally biases the rod to the illustrated position. It will be apparent that the socket member C′ rotates with the end gear 40′ and that the rod 98 is displaceable to the left by an end of a mandrel inserted into the axial bore 104 thereof. The mandrel has a tapered end having a diametrical slot formed therein for receiving the pin 106 carried by the rod 98. A flat, rectangular bar 105, made of a tough plastic material, is secured to wall 97 of the cap (FIGURE 15) and serves as a support for the mandrel to facilitate the coupling of the mandrel to the pin 106. For this purpose, the bar 105 is disposed substantially in a horizontal plane when the socket member is positioned in the winding station, see FIGURE 11.

The construction and arrangement of the socket member D′ (FIGURE 14) is similar to that of the socket member C′. However, the body 107, of the socket member D′ passes through an arcuate slot 108 of the end gear 40′ as well as the circular opening 87′ in the frame 11′, and is secured to the end gear 41′. Also, the arcuate arm 109 is shorter than the corresponding arm 71 carried by the socket member C′. Thus, the switch-operating dogs secured to these socket members rotate in spaced, parallel planes to effect separate control functions upon rotation of one or the other of the turrets. In summary to this point, all of the socket members A′, B′, C′ and D′ carried by the left ends of the two turrets (see FIGURE 11), are spring-loaded, adjacently-disposed socket members are carried by different turrets and the solid rod of each socket member is not only axially displaceable but, also, rotatable by a mandrel coupled thereto.

Figure 16:
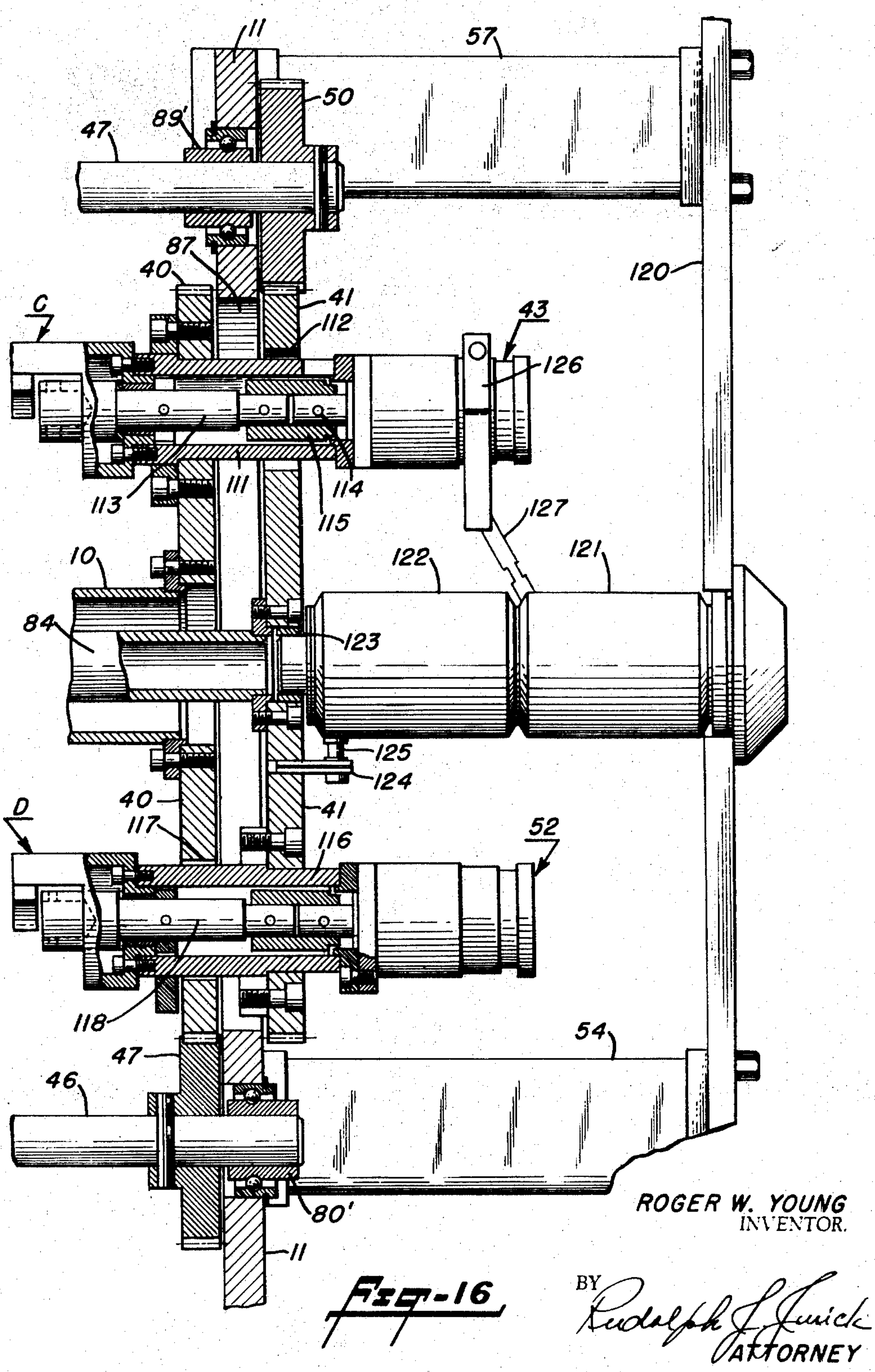
FIGURE 16 is similar to FIGURE 14 but showing the mandrel-supporting members and the parts of the two turrets disposed at the right end of the machine.

Reference now is made to FIGURE 16 which figure corresponds to FIGURE 14 and shows the socket members and turret parts disposed at the opposite end of the machine. The lower drive shaft 46, supported by the bearing 80′, has secured thereto the drive gear 47 which is in mesh with the end gear 40 of the inner turret, said end gear being secured to the outer tubular shaft 10. Similarly, the upper drive shaft 47, supported by the bearing 89′, has secured thereto the drive gear 50 which is in mesh with the end gear 41 of the outer turret, said end gear being secured to the inner, tubular shaft 84. The body 111, of the socket member C, is secured to the end gear 40 and extends through the circular opening 87, formed in the machine frame 11, and through an arcuate opening 112 of the end gear 41. This socket member is in axial alignment with the socket member C′ shown in FIGURE 14 and the facing ends of these socket members are of similar construction. The socket member C, however, is not spring-biased and its solid rod 113 is secured to the output shaft 114 of the hydraulic motor 43 by means of the coupling 115, said motor having its frame secured to the end of the body 111, see also FIGURE 10. On the other hand, the body 116, of the socket member D, is secured to the end gear 41 and extends through the machine frame opening 87 and through an arcuate opening 117 of the end gear 40. This socket member D, which is in axial alignment with the socket member D′ shown in FIGURE 14, has its rod 118 mechanically-coupled to the output shaft of the hydraulic motor 52. As stated hereinabove, with specific reference to FIGURE 10, four tubular posts 54–57 are secured to the machine frame 11 and serve as supports for a vertical plate. Such plate 120, FIGURE 16, supports one end of a conventional rotary union having two housings 121 and 122. The other end of this union is supported by a sleeve 123 carried by the end gear 41. A pin 124, driven into a hole provided in the end gear 41, passes through a hole formed in the radial arm 125 which is secured to the union housing 122, thereby coupling said end gear and housing for simultaneous rotation thereof. A clamp 126 secured to the motor 43 (see also FIGURE 10) has a bifurcated end receiving an arm 127 secured to the union housing 121, whereby this housing rotates with the end gear 40. The connecting lines between the motors and the rotary union are not shown in the drawings. Those skilled in this art will understand that the rotary union serves to direct the flow of a liquid to and from a particular motor during a predetermined time period of the machine operating cycle. Specifically, shortly after a motor is positioned in the winding station, liquid under pressure is applied thereto, thereby to wind the tape onto the core carried by the associated mandrel, and such motor continues operating for a short time after the wound roll is moved out of the winding station, thereby to wrap the tail end of the cut tape onto the roll by the contact roll, as has been described hereinabove with reference to FIGURE 7.

Figure 17:
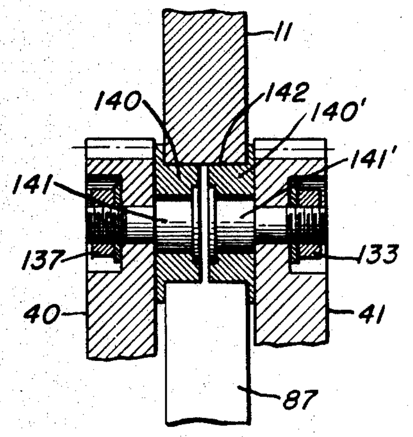
FIGURES 17–18 are fragmentary, cross-sectional views showing the roller supports for the turrets.

Referring back to FIGURE 10, showing the righthand end of the machine, attention is directed to the four nuts identified by the numerals 130–133 and disposed within bores formed in the end gear 41 of the outer turret. The proximate end gear 40 of the inner turret (see FIGURE 9) carries four similar nuts, only three of such nuts being visible in this particular view and being identified by the numerals 136–138. Each of these nuts are threaded onto the ends of studs carrying rollers which are in peripheral engagement with the wall defining the large circular opening formed in the frame 11, thereby to provide for a coaxial rotation of the two turrets. This construction and arrangement is shown in FIGURE 17 which is a cross-sectional view taken along the line 17—17 of FIGURE 9 and assuming that the end gear 41 (FIGURE 10) has been rotated clockwise from the illustrated position to the point where the nut 133 is aligned with the nut 137 of FIGURE 10. The roller 140 is rotatable about a sleeve bearing carried by the larger-diameter shank portion of the stud 141 having a flat head disposed within a bore formed in the roller. The reduced-diameter end of this stud passes through a hole formed in the end gear 40 and communicating with the bore accommodating the nut 137 and a lock washer. The roller 140 is in peripheral engagement with the wall 142 defining the circular opening 87 (see also FIGURE 16) formed in the machine frame 11 and such roller includes an integral flange which is in engagement with the inner surface of the frame. A similar roller 140′ is caried by the similar stud 141′ secured to the end gear 41 by the nut 133. It will be noted that the facing surfaces of the two rollers are spaced apart from each other to permit unobstructed rotation of the one end gear relative to the other. It will now be apparent that he four rollers carried by he four studs associated with the nuts 130–133 (FIGURE 10) bear against the wall defining the circular opening in the frame, whereby the end gear 41 is rotatable, by the drive gear 50, about an axis coinciding with the center of the frame opening. Similarly, the four rollers carried by the four studs associated with the four nuts carried by the end gear 40 (FIGURE 9) also bear against the wall defining the frame opening whereby such end gear is rotatable, by the drive gear 45 about the same axis, which gear is secured to the same drive shaft as the drive gear 50.

Figure 18:
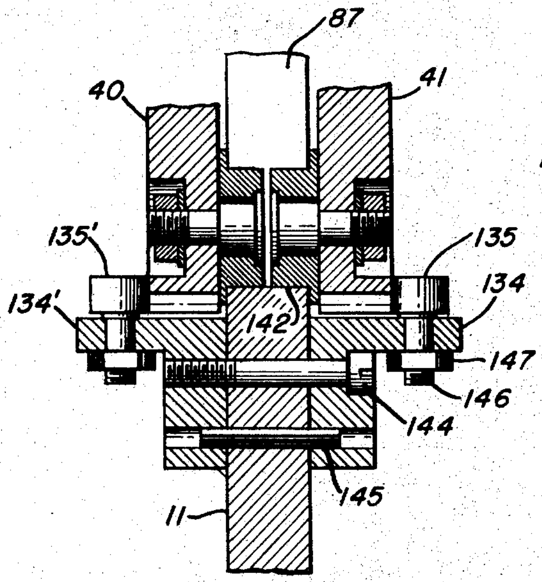

Partially visible in FIGURE 10 is an L-shaped bracket 134 carrying a roller 135 in contact with the face of the end gear 41. A similar bracket 134′ carries a similar roller 135′ in contact with the face of the end gear 40, as seen in FIGURE 9. Reference now is made to FIGURE 18, which is a cross-sectional view taken along a radial plane passing through the center of the roller 135 of FIGURE 10. Here are shown the two L-shaped brackets 134 and 134' secured to the frame 11 by means of a bolt 144. Two locating pins positioned to either side of the bolt serve to establish the proper orientation of the brackets relative to the end gears 40 and 41, one such pin 145 being shown in dotted lines. The roller 135, in contact with the face of the end gear 41, is rotatable about a stud 146 having a threaded end and secured to the bracket by the nut 147, and the similar roller 135', carried by the bracket 134', is in contact with the face of the end gear 40. These rollers serve to prevent axial displacement of the two end gears relative to the machine frame. In FIGURE 17, the end gears are shown in positions wherein the inner rollers 140 and 140' are in alignment and disposed substantially at the uppermost point of their travel. In FIGURE 18, the end gears have been rotated so that these particular rollers are in alignment and proximate to the described, L-shaped brackets.

Referring again to FIGURE 9, the diametrically-opposed socket members A and C include integral, outwardly-directed lugs which are bolted to the end gear 40. On the other hand the other socket members B and D, which are secured to the other end gear 41, each include a single, wider lug slidable along the face of the end gear 40 upon relative rotation of the two end gears. Each of the end gears 40' and 41', disposed at the left hand of the machine (see FIGURE 11), also carry inner rollers which are in peripheral contact with the wall defining the circular hole formed in the machine frame 11'. Although not shown in this figure, the frame 11' also carries L-shaped brackets and outer rollers corresponding to those shown in FIGURE 18. In the described arrangement for supporting the turrets, both turrets are rotatable about a common axis. Also, axial displacements of the turrets are eliminated, thereby resulting in the winding of tape rolls having smooth sides.

Figure 19:
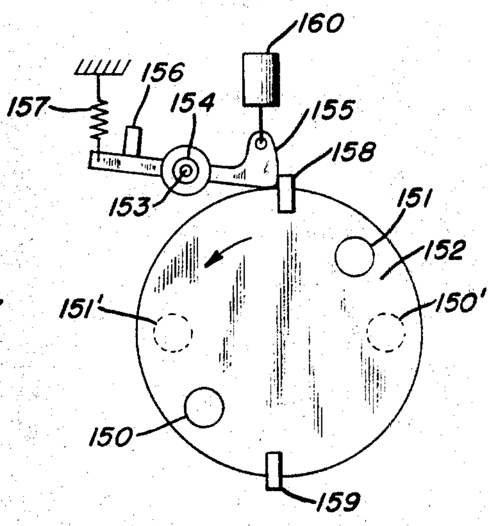
FIGURE 19 is a diagrammatic representation, in elevation, showing an arrangement to limit turret rotation for the proper positioning of a mandrel-suporting member in the winding station.

Reference now is made to the diagrammatic representation of FIGURE 19 showing diametrically-opposed socket members 150 and 151 carried by a turret end gear 152. A rotatable rod 153 carries a rubber washer 154 and a crank arm 155, which arm normally is biased against a fixed stop 156 by a spring 157. A curved end of the crank arm normally lies in the path of travel of stops 158 and 159 carried by the end gear. When the stop member 158 is in engagement with the crank arm, the socket member 150 is positioned in the winding station of the machine. A solenoid 160 is energized, momentarily, to rotate the crank arm out of engagement with this stop member, whereby the end gear is free to rotate to move the socket members to the positions shown by the dotted lines and identified by corresponding, primed reference numerals, said socket members now being disposed in the unloading station and in the ready position, respectively. As has been described above, adjacently-disposed socket members are carried by different turrets. Thus, as the socket member 150 moves out of the winding station, the trailing socket member, carried by the other turret, moves into the winding station. During the next operating cycle, the end gear 152 is rotated until the stop member 159 strikes the crankarm, at which time the socket member 151 will be positioned in the winding station. The rubber washer 154 serves to absorb the shock developed at the moment of impact. A similar crankarm and stop member arrangement is associated with the end gear of the other turret. The described arrangement assures a precise positioning of the socket members in the winding station, whereby the fly knife can be positioned to cut the web very close to the new core and all of the rolls of tape will be smoothly wound.

One winding cycle of the machine will now be described with reference to the diagrammatic representation of FIGURE 20 wherein those components which have been described are identified by the previously-applied reference characters. For purposes of simplification, the contact rolls 22 and 25 are here shown as being spring-biased rather than hydraulically actuated. Specifically, the contact roll 22 is maintained in contact with the tape roll 30, being wound on the core 161 carried by the mandrel 35, by the spring 162, whereas the spring 163 biases the contact roll 25 to a normal position defined by a fixed stop 164. Also, an electrical control circuit is shown, including electric drive motors for rotation of the mandrels. The main drive shaft 74, driven by the machine motor 165, rotates continuously when the machine is in operation, said drive shaft carrying the two electromagnetic clutches 166 and 167, which clutches normally are de-energized. Upon energization of the clutch 166, the sprocket 76' is coupled to the drive shaft 74, thereby resulting in the rotation of the turret drive shaft 46 through the chain-coupled sprocket 76. This results in the rotation of the drive gears 45 and 45' which are in mesh with the respective end gears 40 and 40' of the inner turret. Similarly, energization of the clutch 167 results in the rotation of the turret drive shaft 47 through the chain-coupled sprockets 77 and 77', thereby resulting in the rotation of the drive gears 50 and 50' which are in mesh with the respective end gears 41 and 41' of the outer turret. One pair of socket members A and C and their drive motors 42 and 43 are carried by the end gear 40 and are axially aligned with corresponding socket members carried by the associated end gear 40', only the socket A' being shown in the drawing. The other pair of socket members B and D and their drive motors 52 and 53 are carried by the end gear 41 and are axially aligned with corresponding socket members carried by the associated end gear 41'. The aligned socket members D and D' are positioned in the unloading station whereas the aligned socket members A and A' are positioned in the winding station.

The two electro-magnetic clutches are de-energized, the two turrets are retained in fixed positions and the web 16 is being wound into a roll 30 on the core 161 carried by the mandrel 35 rotatably coupled to the socket member A. The drive motor 42 is energized, one lead of the motor winding being connected to ground and the other lead 168 being connected to the positive side of the line through the closed contacts 169 of a power relay 170. This relay is of the normally-open type and has been energized shortly after the socket members A and A' have been positioned in the winding station as will be described hereinbelow. For the present, it is pointed out that this relay is locked-in electrically through the normally-closed contacts of a switch 172 having an operating pin lying in the path of travel of a dog 173 carried by the end gear 40', the electrical lock-in circuit being traced as follows; the closed contacts of the switch 172 connected to the positive side of the line, the lead 174, closed relay contacts 175, the relay operating coil 176 and the grounded lead 177.

A cam 179, rotatable with the roll 31, closes and opens a switch 180, thereby applying electrical pulses to a conventional counter device 181. When a predetermined number of pulses have been applied to this device, corresponding to a desired length of tape to be wound on the roll, the device momentarily closes a switch 182 having one contact connected to the positive side of the line and the other contact connected to the operating coils of two, normally-open power relays 183 and 184. Upon closure of the contacts 185, of the relay 183, this relay locks-in electrically through the normally-closed switch 186 having an operating pin lying in the path of travel of the dog 173 carried by the end gear 40', the locking circuit being traced as follows; the closed switch 186 connected to the positive side of the line, lead 187, now-closed relay contacts 185, the relay operating coil 188 and the grounded lead 189. Similarly, the relay 184 locks-in electrically upon closure of its contacts 190, one of such contacts being connected to the relay operating coil and the other contact being connected, by the lead 191 to a fixed contact 193 of a double-throw switch 194 having an operating pin lying in the path of travel of a dog 195 carried by the end gear 41', said switch contact 193 being normally in engagement with the movable switch contact 196 which is connected to the positive side of the line. The electro-magnetic clutch 166 is connected to the line through the now-closed contacts 197 of the relay 183 and the clutch 167 is connected to the line through the now-closed contacts 198 of the relay 184. Thus, the two turret drive shafts 46 and 47 rotate upon the closure of the switch 182 of the counter device 181 and these shafts continue to rotate as long as the power relays 183 and 184 remain energized. As the two turrets rotate, the wound roll 30, still rotating, moves out of the winding station and into engagement with the contact roll 25 and, simultaneous, the new core, carried by the mandrel coupled to the socket member B, moves toward the winding station. When the new core, which is not rotating, is positioned in the winding station, the dog 195, carried by the end gear 41', opens the contacts 193 and 196 of the switch 194, thereby opening the electrical lock-in circuit of the power relay 184, whereupon the relay drops back to its normally-open condition. Upon opening of the relay contacts 198, the electro-magnetic clutch 167 is de-energized, whereupon the outer turret, comprising the end gears 41 and 41' stops rotating. It is here pointed out that the clutches are conventional clutch-brake devices to minimize over travel of the turrets. Although the outer turret has stopped rotation, the relay 183 remains energized and the inner turret continues to rotate.

When the new core is positioned in the winding station, the contacts 196 and 200, of the switch 194 are closed, thereby connecting the positive side of the line to the normally-open switch 201 associated with the end gear 40'. Shortly after the outer turret has stopped rotating, the dog 173, on the still-rotating end gear 40', momentarily closes the contacts of the switch 201, thereby energizing the solenoid 202 which operates the fly knife 26 to cut the web. At the same time, the momentary closure of the switch 201 results in the energization of the operating coil 203 of a relay 204, the circuit being traced as follows; the now-closed contacts 196 and 200 of the switch 194, leads 205 and 206, momentarily-closed switch 201, and the lead 207 connected to the non-grounded side of the relay operating coil 203. Upon closure of the relay upper contacts 208, the relay 204 locks-in electrically through the normally-closed switch 209 having an operating pin lying in the path of travel of the dog 195, such lock-in circuit being traced as followes; the closed switch 209 connected to the positive side of the line, lead 210, and the now-closed relay contacts 208 which are connected to the undergrounded side of the operating coil 203. On the other hand, closure of the relay lower contacts 212 results in the energization of the motor 52 through the lead 213, said motor being coupled to the socket member B. The tape now is wound onto the new core, but the inner turret, carrying the previously-wound roll 30 continues to rotate. When the dog 173, carried by the end gear 40', depresses the operating pin of the switch 172, this switch opens, thereby opening the electrical lock-in circuit to the relay 170. This relay drops out, the contacts 169 open and the motor 42 is de-energized. Such de-energization of the motor 42 occurs at a time after the wound roll 30 has been brought into engagement with the contact roll 25, so that the cut tail of the tape is wound smoothly onto the finished roll. Thereafer, the dog 173 opens the switch 186 to remove the electrical lock-in circuit to the relay 183. This relay drops out, the opening of its contacts 197 removes the power to the clutch 166 and the inner turret stops rotating. At this point, the finished roll 30 is positioned in the unloading station.

As has been described hereinabove, the fly-knife cuts the web of tape very close to the new core immediately after such core has been positioned in the winding station. During the tape cutting operation the adhesive side of the tape is pressed against the new core, thereby resulting in the automatic attachment of the forward cut end of the web to the core. At about the same time that the web is cut, the new core starts rotating and the winding of the tape into a second roll continues as the previously-wound roll 30 is moved toward and remains in the unloading station. The winding of the second roll of tape continues during the next turret-indexing operation and until the dog 195, carried by the outer turret end gear 41' opens the switch 209, thereby causing the relay 204 to drop out, which results in the opening of the relay contacts 212 and the de-energization of the motor 52. The second turret indexing operation is initiated when the predetermined number of pulses again is applied to the counter device 181.

Figure 20:
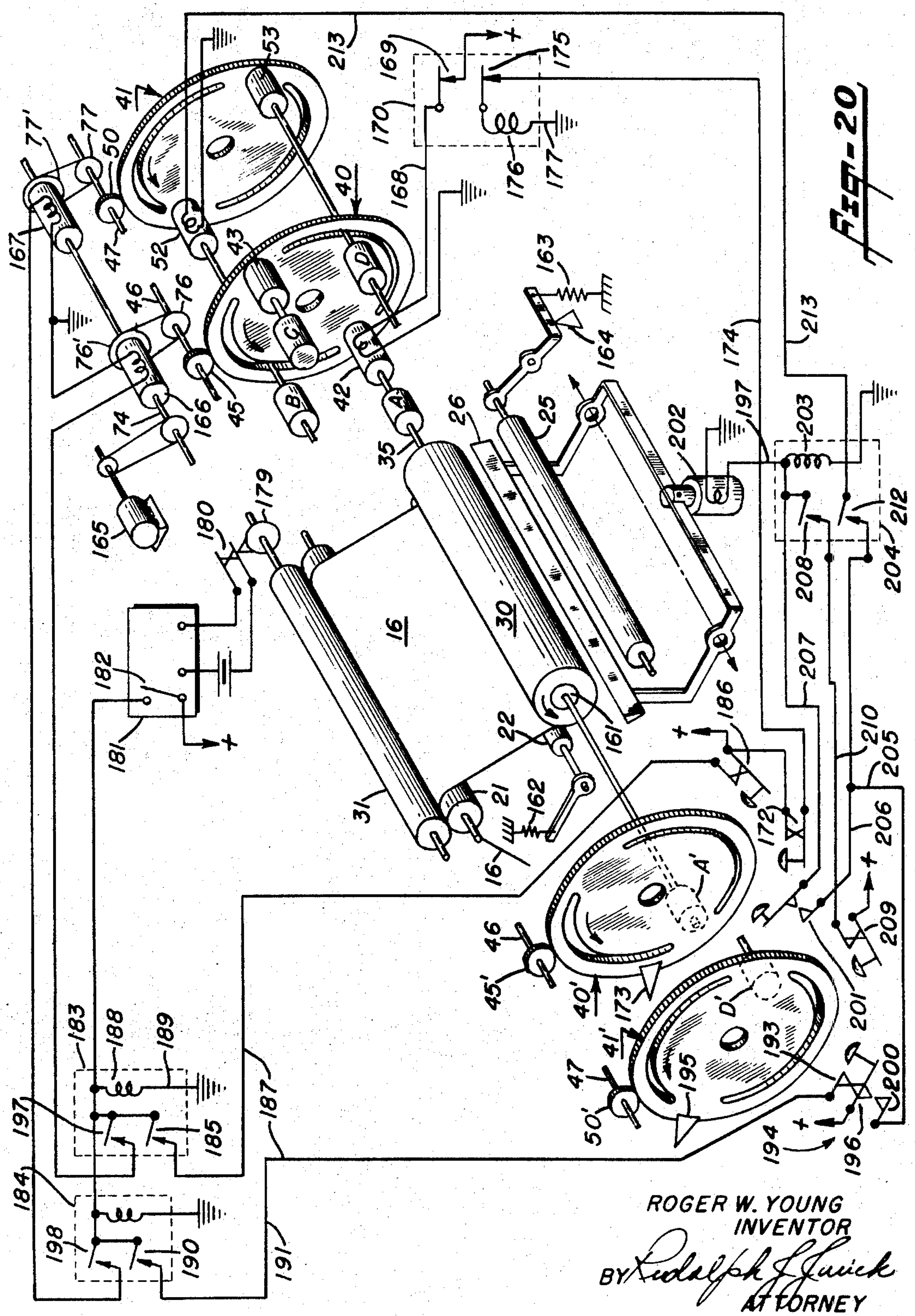
FIGURE 20 is a diagrammatic representation showing a control system for the machine.

FIGURE 20 includes only the number of relays, switches, and switch-actuating dogs necessary to describe one winding cycle of the machine. Those skilled in this are will understand that additional such components are provided for the repeating of the described series of functions four times for one complete revolution of the turrets. Each series of functions may be summarized as follows:

(1) the simultaneous rotation of the inner and outer turrets when a first roll of tape carried by, say, the inner turret, attains a predetermined diameter.

(2) continuing the rotation of the inner turret after rotation of the outer turret has been stopped to position a new core in the winding station, (3) the actuation of the fly knife when the new core has been positioned in the winding station and while the first roll continues rotating and moving toward the unloading station, (4) starting the rotation of the new core either simultaneously with the tape-cutting operation or immediately thereafter, (5) wrapping the tail end of the cut tape onto the first roll by means of the contact roll positioned between the winding station and the unloading station, (6) terminating the rotation of the first roll prior to the time it reaches the unloading station, (7) stopping the rotation of the inner turret to position the first roll in the unloading station, and (8) again initiating the simultaneous rotation of both turrets when the second roll of tape attains the predetermined diameter.

Adjacently-disposed cores are carried by different turrets and the minimum angular spacing between a core positioned in the winding station and the next following core is determined by the diameter to which the rolls are to be wound. In a given machine, such angular spacing is made as small as possible, thereby resulting in a short tail end of the tape to be wrapped around the roll after the cutting operation.

In the actual machine, orbital, hydraulic motors are used for rotating the mandrels, as equivalent electric motors are considerably larger in size and heavier in weight. Also, a complete hydraulic system is preferred for effecting operation of most of the machine components, thereby reducing to a minimum the number of explosion proof components required when the machine is to be used in an explosive atmosphere. In a hydraulic system it is convenient to use pressure regulators to change the speed of the winding motor as the diameter of the wound roll increases, thereby maintaining a constant tension on the web as it is being wound.

I claim:

1. For use in tape winding apparatus, the combination of, (a) a pair of turrets mounted for independent rotation about a common axis, (b) mandrel-supporting members carried by each of the turrets and individually rotatable about axes lying on a circle concentric with the said common axis, adjacently-disposed, mandrel-supporting members being carried by different turrets, and
(c) drive means for rotating the mandrel-supporting members.

2. The invention as recited in claim 1, wherein said drive means comprises a plurality of drive motors, each motor being individually coupled to a mandrel-supporting member.

3. The invention as recited in claim 1, including turret indexing means for rotating both turrets simultaneously to move a first mandrel-supporting member into a winding station, stopping the rotation of one turret to retain such first mandrel-supporting member in the winding station, while continuing the rotation of the other turret to move an adjacent mandrel-supporting member which previously occupied the winding station to an unloading station, and stopping the rotation of said other turret when the said adjacent mandrel-supporting member reaches the unloading station.

4. The invention as recited in claim 3, including a tape cutter and means actuating the tape cutter after the said first mandrel-supporting member is brought to a stop in the winding station and while the said adjacent mandrel-supporting member is moving toward the unloading station.

5. The invention as recited in claim 4, including core-carrying mandrels removably coupled to each of the mandrel-supporting members; a first contact roll biased for pressure contact with a core positioned in the winding station; and a second contact roll positioned between the winding station and the unloading station.

6. The invention as recited in claim 5, including means moving the said first contact roll away from said core prior to actuation of the tape cutter.

7. Apparatus for winding a web of pressure-sensitive tape, having a coated side, into rolls upon cores moved successively into a winding station, said apparatus comprising,
(a) a pair of turrets mounted for independent rotation about a common axis,
(b) a pair of diametrically-opposed, mandrel-supporting members carried by each of the turrets, said mandrel-supporting members being rotatable about individual axes lying on a common circle concentric with said common axis and adjacently-disposed mandrel-supporting members being carried by different turrets,
(c) drive means for rotating the mandrel-supporting members,
(d) mandrels removably secured to each of the mandrel-supporting members, each mandrel carrying a core upon which the web of tape is to be wound,
(e) means feeding the web of tape to the winding station with said coated side thereof presented to a core positioned in the winding station,
(f) a first contact roll biased in a direction to press the web of tape against the core positioned in the winding station,
(g) means actuating the drive means associated with the core positioned in the winding station, thereby to wind a roll of tape on such core,
(h) a fly knife,
(i) control means actuated when the roll of tape has a predetermined diameter,
(j) turret-indexing means operable upon actuation of said control means, said indexing means first rotating both turrets simultaneously thereby to move the roll of tape out of the winding station and toward an unloading station and to move the adjacent, trailing core toward the winding station, then stopping the rotation of one turret to retain the said trailing core in the winding station while continuing the rotation of the other turret carrying said roll of tape, and finally stopping rotation of the said other turret when the roll of tape is positioned in an unloading station, and
(k) means actuating the fly knife to cut the web of tape after the said trailing core is positioned in the winding station and while the roll of tape is moving toward the unloading station, said fly knife being arranged to cut the web close to said trailing core and in a direction such that the leading end of the cut web is pressed against said trailing core during the web-cutting operation.

8. The invention as recited in claim 7, wherein the said drive means comprises hydraulic motors individually coupled to each of the mandrel-supporting members.

9. The invention as recited in claim 8, including a second contact roll, positioned for engagement with the roll of tape during movement of the roll of tape toward the unloading station, and wherein the associated hydraulic motor continues rotating the roll of tape at least until the roll of tape engages the second contact roll.

10. The invention as recited in claim 9, wherein the one turret comprises an outer tubular shaft having a first end gear secured thereto, said end gear having a pair of arcuate openings formed therein; the other turret comprises a shaft passing through the said tubular shaft and having a second end gear secured thereto, said end gear having a pair of arcuate openings formed therein; the said first end gear carries one pair of the mandrel-supporting members and the associated hydraulic motors, each such mandrel-supporting member having a rotatable element passing through an arcuate opening of said second end gear and coupled to the associated hydraulic motor; and the said second end gear carries another pair of the mandrel-supporting members and the associated hydraulic motors, each such mandrel-supporting member having a rotatable element passing through an arcuate opening of said first end gear and coupled to the associated hydraulic motor.

11. In apparatus for winding a web of material into rolls, the combination of,
(a) spaced, parallel frame members having aligned circular openings formed therein,
(b) a tubular shaft having first and second end gears secured thereto and positioned proximate to the inner surfaces of the frame members,
(c) a plurality of rollers carried by each of the said first and second end gears, which rollers are in peripheral contact with the wall defining the circular opening in the proximate frame member,
(d) a second shaft extending through the tubular shaft and having second and third end gears secured thereto and positioned proximate to the outer surfaces of the frame members,
(e) a plurality of rollers carried by each of the said second and third end gears, which rollers are in peripheral contact with the wall defining the circular opening in the proximate frame member,
(f) a first pair of rotatable mandrel-supporting members and a first pair of drive motors carried by the said first end gear,
(g) means coupling said first pair of drive motors individually to said first pair of mandrel-supporting members,
(h) a second pair of rotatable mandrel-supporting members carried by said second end gear and aligned with the said first pair of mandrel-supporting members,
(i) mandrels having ends removably secured to the aligned mandrel-supporting members of said first and second pair,
(j) a third pair of rotatable mandrel-supporting members and a second pair of drive motors carried by the said third end gear, (k) means coupling said second pair of drive motors individually to said third pair of mandrel-supporting members, (l) a fourth pair of rotatable mandrel-supporting members carried by the said fourth end gear and aligned with the said third pair of mandrel-supporting members, (m) mandrels having ends removably secured to the aligned mandrel-supporting members of said third and fourth pair, (n) a first set of drive gears carried by the frame members and coupled to said first and second end gears, and (o) a second set of drive gears carried by the frame members and coupled to said third and fourth end gears.

12. The invention as recited in claim 11, including means forming arcuate openings in each of the said first and third end gears; wherein the said first pair of mandrel-supporting members are coupled to the associated drive motors by elements passing through the circular opening in the proximate frame member and through the arcuate openings formed in the said third end gear, and wherein the said third pair of mandrel-supporting members are coupled to the associated drive motors by elements passing through the said circular opening and through the arcuate openings formed in the said first end gear.

13. The invention as recited in claim 12, including means forming arcuate openings in each of the said second and fourth end gears; wherein the said second pair of mandrel-supporting members include portions passing through the circular opening in the proximate frame member and through the arcuate openings formed in the said fourth end gear, and wherein the said fourth pair of mandrel-supporting members include portions passing through said circular opening and through the arcuate openings formed in the said second end gear.

References Cited

UNITED STATES PATENTS

| | | | |
|---|---|---|---|
| 2,992,786 | 7/1961 | Scusa | 242—64 |
| 3,377,032 | 4/1968 | Jacobs et al. | 242—56 |
| 3,383,062 | 5/1968 | Meihofer et al. | 242—56 |
| 3,411,732 | 11/1968 | Ebneter | 242—56 |

JORDAN FRANKLIN, Primary Examiner

W. H. SCHROEDER, Assistant Examiner

U.S. Cl. X.R.

242—64